US008472615B2

(12) United States Patent
Fang et al.

(10) Patent No.: US 8,472,615 B2
(45) Date of Patent: Jun. 25, 2013

(54) METHOD, SYSTEM, AND DEVICE FOR POWER ADJUSTMENT OF VECTORED DIGITAL SUBSCRIBER LINE (VECTORED-DSL)

(75) Inventors: Liming Fang, Shenzhen (CN); Raphael Cendrillon, SaiYing Pun (CN); Pengrui Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 155 days.

(21) Appl. No.: 13/097,347

(22) Filed: Apr. 29, 2011

(65) Prior Publication Data

US 2011/0200080 A1  Aug. 18, 2011

Related U.S. Application Data

(63) Continuation of application No. PCT/CN2009/072866, filed on Jul. 22, 2009.

(30) Foreign Application Priority Data

Oct. 31, 2008   (CN) .......................... 2008 1 0172310

(51) Int. Cl.
*H04M 1/24*   (2006.01)
*H04M 1/76*   (2006.01)

(52) U.S. Cl.
USPC .................. 379/399.01; 379/27.03; 379/417

(58) Field of Classification Search
None
See application file for complete search history.

(56) References Cited

U.S. PATENT DOCUMENTS

| 6,988,212 | B1 | | 1/2006 | Hamdi |
| 7,167,548 | B1 | | 1/2007 | Fedane |
| 7,835,429 | B1 | * | 11/2010 | Cendrillon ............... 375/222 |
| 2006/0029148 | A1 | | 2/2006 | Tsatsanis |
| 2006/0198430 | A1 | * | 9/2006 | Rhee et al. .............. 375/222 |
| 2006/0274893 | A1 | * | 12/2006 | Cioffi et al. ........... 379/399.01 |
| 2008/0219290 | A1 | * | 9/2008 | Cioffi et al. ............... 370/465 |
| 2008/0251806 | A1 | | 10/2008 | Erchak |
| 2009/0022213 | A1 | | 1/2009 | Shi |

FOREIGN PATENT DOCUMENTS

CA      2610814 A1   12/2006

OTHER PUBLICATIONS

1$^{st}$ Office Action in corresponding Chinese Patent Application No. 200810172310.6 (Aug. 20, 2012).

(Continued)

*Primary Examiner* — Simon Sing
*Assistant Examiner* — Jeffrey Lytle
(74) *Attorney, Agent, or Firm* — Leydig, Voit & Mayer, Ltd.

(57) ABSTRACT

A method, a system, and a device for power adjustment are provided. The method includes: determining whether transmission power of a line needs adjustment according to feedback errors during a training procedure of a Vectored-Digital Subscriber Line (Vectored-DSL) filter; and adjusting the transmission power when the transmission power of the line needs adjustment. By automatically determining whether the transmission power needs adjustment during a training procedure of a precoder or canceller, and adjusting the transmission power automatically when the transmission power needs adjustment, interference to other subscribers caused by the precoder or canceller during the training procedure is reduced, and call drops of the other subscribers are prevented.

6 Claims, 6 Drawing Sheets

OTHER PUBLICATIONS

International Search Report in corresponding International Patent Application No. PCT/CN2009/072866 (Oct. 29, 2009).
Written Opinion of the International Searching Authority in corresponding International Patent Application No. PCT/CN2009/072866 (Oct. 29, 2009).

International Search Report from P.R. China in International Application No. PCT/CN2009/072866 mailed Oct. 29, 2009.
$1^{st}$ Office Action in corresponding Chinese Patent Application No. 200810172310.6 (Nov. 5, 2012).

* cited by examiner

METHOD, SYSTEM, AND DEVICE FOR POWER ADJUSTMENT OF VECTORED DIGITAL SUBSCRIBER LINE (VECTORED-DSL)

CROSS-REFERENCE TO RELATED APPLICATIONS

This application is a continuation of International Application No. PCT/CN2009/072866, filed on Jul. 22, 2009, which claims priority to Chinese Patent Application No. 200810172310.6, filed on Oct. 31, 2008, both of which are hereby incorporated by reference in their entireties.

FIELD OF THE DISCLOSURE

The present disclosure relates to a Vectored-Digital Subscriber Line (Vectored-DSL) technology in the field of communications technologies, and more particularly to a method, a system, and a device for power adjustment.

BACKGROUND

The xDSL is a high-speed data transmission technology for transmitting data in telephone twisted-pairs. With the increase of a frequency band used by the xDSL, the crosstalk problem at a high frequency band becomes more prominent. When multiple subscribers need to launch an xDSL service in a bundle of cables, due to the crosstalk problem, rates of some lines become lower, performance of them becomes unstable, and sometimes the service even cannot be launched. As a result, a Digital Subscriber Line Access Multiplexer (DSLAM) has a low line activation rate. Multiple twisted-pairs are present on the cables of the subscribers, and various services may run on each twisted-pair. When various types of xDSLs work simultaneously, crosstalk is generated between the lines, and the performance of some lines drops sharply due to the crosstalk problem. When lengths of the lines are relatively great, the lines of some twisted-pairs cannot launch any forms of DSL services at all coordinated transceiver In the prior art, coordinated transmission and reception are performed by using a precoder or canceller at a DSLAM end, and crosstalk is cancelled by using a signal processing method, so that crosstalk in each path of signal is eventually reduced. However, the existing precoder or canceller has great interference on an adjacent subscriber during a training procedure, and even leads to call drops of other subscribers when the interference is serious.

SUMMARY

Embodiments of the present disclosure provide a method, a system, and a device for power adjustment, so as to reduce interference to an adjacent subscriber during a training procedure.

In order to achieve the objective, a method for power adjustment provided in an embodiment of the present disclosure includes:
determining whether transmission power of a line needs adjustment according to feedback errors during a training procedure of a Vectored-DSL filter; and
adjusting the transmission power when the transmission power of the line needs adjustment.

A system for power adjustment provided in an embodiment of the present disclosure includes:
a transceiver, configured to transmit a training sequence and start a training procedure; and
a DSLAM, configured to determine whether transmission power of a line needs adjustment according to feedback errors during the training procedure of a Vectored-DSL filter, and adjust the transmission power when the transmission power of the line needs adjustment.

A DSLAM provided in an embodiment of the present disclosure includes:
a determination module, configured to determine whether transmission power of a line needs adjustment according to feedback errors during a training procedure of a Vectored-DSL filter; and
an adjustment module, configured to adjust the transmission power when the determination module determines that the transmission power of the line needs adjustment.

Compared with the prior art, the embodiments of the present disclosure have the following advantages: during a training procedure of a Vectored-DSL precoder or canceller, it is determined automatically whether the transmission power needs adjustment, and the transmission power is adjusted automatically when the transmission power needs adjustment, so that interference to other subscribers caused by the precoder or the canceller during the training procedure is reduced, and call drops of other subscribers are prevented.

BRIEF DESCRIPTION OF THE DRAWINGS

To make the technical solutions in the embodiments of the present disclosure or in the prior art more comprehensible, the accompanying drawings required for illustrating the embodiments of the present disclosure or in the prior art are briefly introduced in the following. Apparently, the accompanying drawings in the following description merely illustrate some embodiments of the present invention, and persons of ordinary skill in the art can obtain other accompanying drawings according to the accompanying drawings without any creative effort.

DETAILED DESCRIPTION OF THE EMBODIMENTS

The technical solutions in the embodiments of the present disclosure are illustrated in detail with reference to the accompanying drawings. It is apparent that the embodiments are only a part of embodiments of the present invention instead of all the embodiments of the present disclosure. All other embodiments obtained by persons of ordinary skill in the art based on the embodiments in the present invention without any creative effort should fall within the protection scope of the present disclosure.

Figure 1:
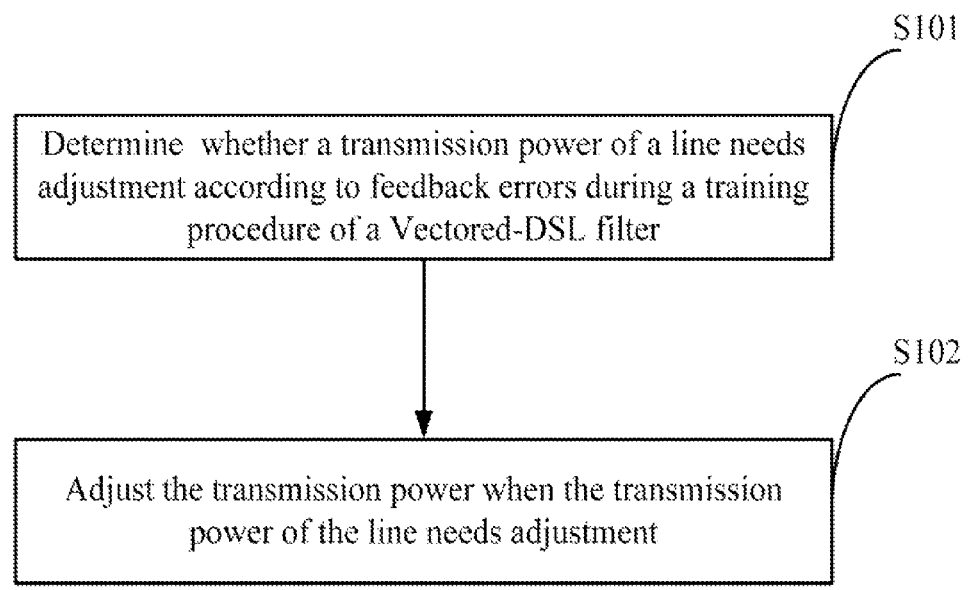
FIG. 1 is a flow chart of a method for power adjustment according to a first embodiment of the present disclosure.

A first embodiment of the present disclosure provides a method for power adjustment. As shown in FIG. 1, the method includes:

Step S101: Determine whether transmission power of a line needs adjustment according to feedback errors during a training procedure of a Vectored-DSL filter.

Step S102: Adjust the transmission power when the transmission power of the line needs adjustment.

It can be seen that, in the embodiment of the present disclosure, it is determined automatically whether the transmission power needs adjustment during a training procedure of a Vectored-DSL precoder or canceller, and the transmission power is automatically adjusted when the transmission power needs adjustment, so that interference to other subscribers caused by the precoder or the canceller during the training procedure is reduced, and call drops of the other subscribers are prevented.

Figure 2:
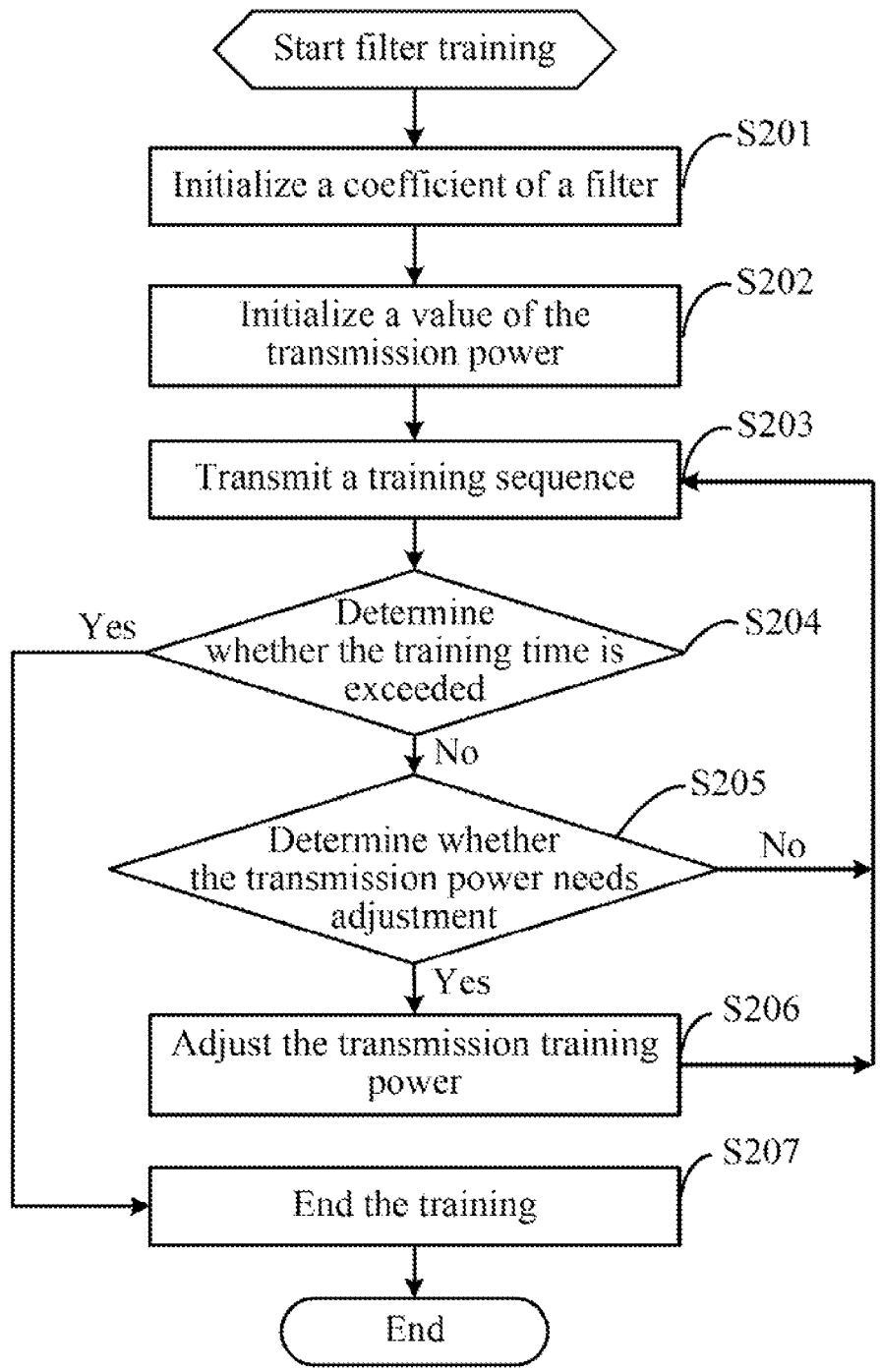
FIG. 2 is a flow chart of a method for power adjustment according to a second embodiment of the present disclosure.

A second embodiment of the present disclosure provides a method for power adjustment. As shown in FIG. 2, the method includes:

Step S201: A DSLAM initializes a coefficient of a filter after filter training starts.

Figure 3:
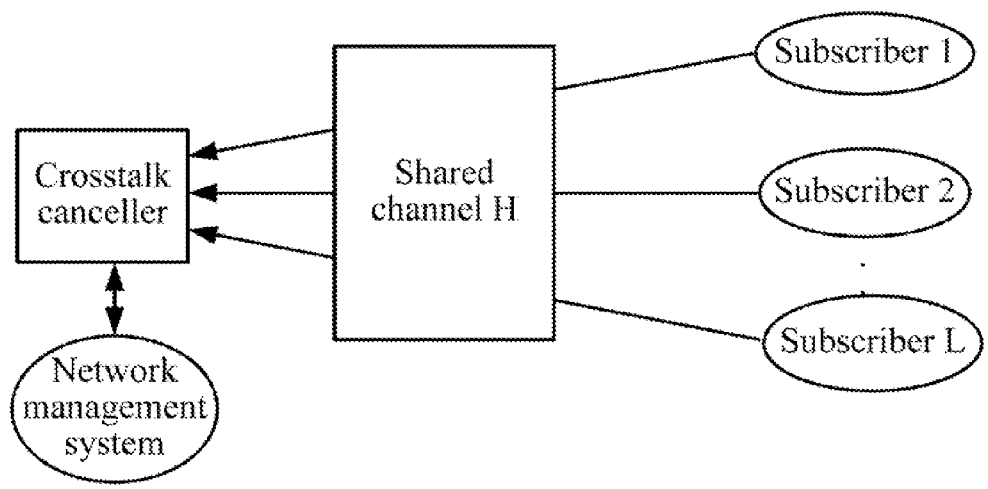
FIG. 3 is a schematic diagram of transmission from a subscriber end to a central office according to the second embodiment of the present disclosure.
Figure 4:
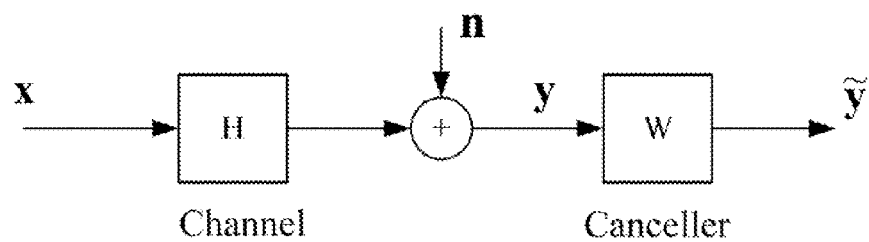
FIG. 4 is a schematic diagram of an implementation of cancellation from a subscriber end to a central office according to the second embodiment of the present disclosure.

Specifically, when crosstalk of a Vectored-DSL is cancelled, an uplink direction and a downlink direction are involved in the implementation. Transmission in the uplink direction refers to transmission from a subscriber end to a central office (that is, a receiving end). As shown in FIG. 3, in the uplink transmission, coordinated receiving and processing are performed at the receiving end for subscribers, and a crosstalk canceller is used to cancel a crosstalk signal at the receiving end, that is, joint crosstalk cancellation is adopted at the receiving end during the uplink transmission. The specific impliertientation mode is shown in FIG. 4. By designing the filter at the receiving end, coordinated crosstalk cancellation is performed on received data, so as to guarantee that no crosstalk interference exists in the data received from the subscribers. The filter designed at the receiving end may be a canceller, and a coefficient of the canceller is W. During the initialization, the coefficient W may be preset to a default value or 0.

Figure 5:
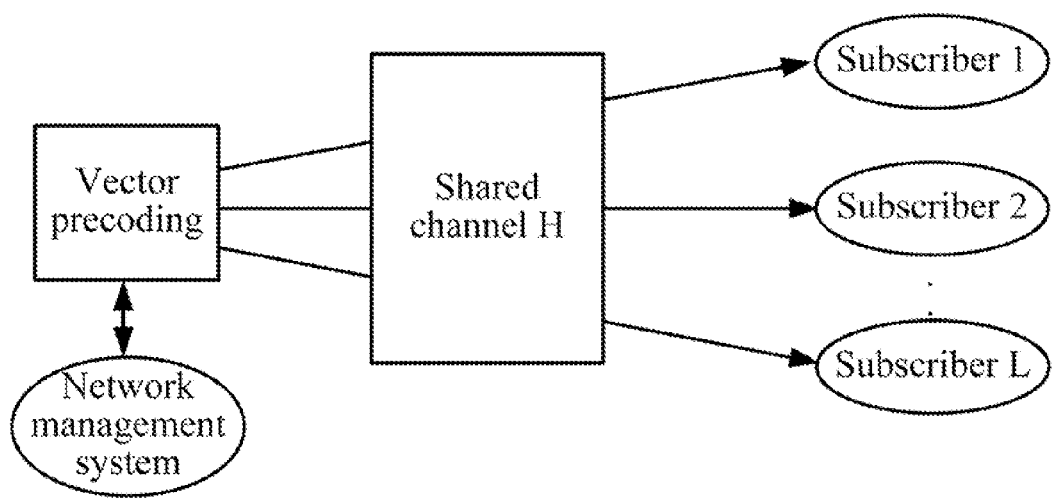
FIG. 5 is a schematic diagram of transmission from a central office to a subscriber end according to the second embodiment of the present disclosure.
Figure 6:
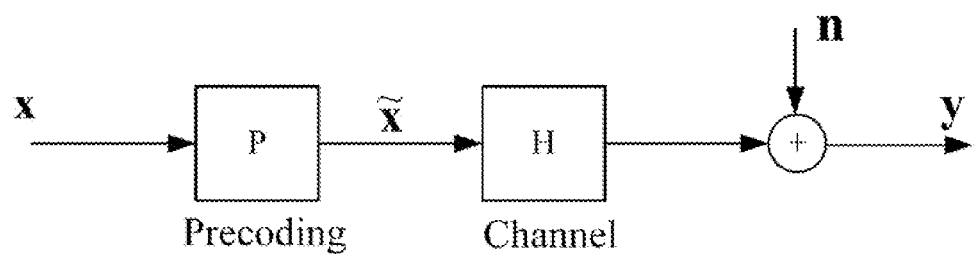
FIG. 6 is a schematic diagram of an implementation of cancellation from a central office to a subscriber end according to the second embodiment of the present disclosure.

Similarly, transmission in the downlink direction refers to transmission from a central office or an optical network unit to a subscriber end. As shown in FIG. 5, during the downlink transmission, precoding is performed at a transmission end to inhibit crosstalk in a line. The specific implementation mode is shown in FIG. 6. By designing the filter at the transmission end, data to be transmitted is pre-processed, so as to guarantee that no crosstalk interference exists in the data transmitted to the subscribers. The filter designed at the transmission end may be a precoder, and a coefficient of the precoder is P. During initialization, the coefficient P may be preset to a default value or 0.

Step S202: The DSLAM initializes a value of the transmission power.

Specifically, the value of the transmission power may be selected according to an empirical value, which is usually a small value or a conservative value. Further, it should be understood that, step S201 may be performed before or after step S202.

Step S203: A transceiver transmits a training sequence.

Specifically, each subscriber transmits a pairwise orthogonal sequence, and the orthogonal sequence can be selected from a Hadamard matrix. The transmitted orthogonal sequence may be used by other subscribers to calculate a crosstalk channel matrix according to feedback errors.

Step S204: The DSLAM determines whether the training time of the filter is exceeded. If the training time is exceeded, the process turns to step S207; if the training time is not exceeded, the process turns to step S205.

The determining whether the training time is exceeded includes presetting a time. The preset time is selective, and may be selected according to an empirical value. When the training time of the filter exceeds the preset time, it is determined that the training time is exceeded.

Step S205: The DSLAM determines whether the transmission power of the line needs adjustment. If the transmission power needs adjustment, the process turns to step S206; if the transmission power needs no adjustment, the process turns back to step S203.

Specifically, in a training procedure of the precoder or canceller, at first, the training is performed with a small transmission power $P_{ini}$ (an initialized transmission power) to reduce influence on other subscribers within a vector group, and feedback errors $e_n(k,t_1)$ of all or partial subscribers within the vector group are read and taken statistics of. Then, the transmission power is increased with $\Delta P$, and feedback errors $e_n(k,t_2)$ of the subscribers within the vector group are read and taken statistics of again. Influence on other subscribers caused by the increase of $\Delta P$ is analyzed according to the feedback errors, so as to establish one correlation coefficient table of the influence on the other subscribers caused by the increase of $\Delta P$. The table varies dynamically, and needs to be continuously updated. A suitable $\Delta P$ is calculated according to a subscriber having great influence in the table, so that $\Delta P$ is used in power adjustment next time. It should be noted that if $\Delta P$ is too large, the filter coefficient of the subscriber may not converge or be deactivated, and if $\Delta P$ is too small, the power after the training ends may not rise to an expected value $P_{train}$.

According to the feedback errors, $\Delta P$ is dynamically updated to adjust the value of the transmission power during the subsequent training procedure, and the method for power adjustment specifically includes the following steps.

In this embodiment, it is assumed that all n subscribers in the vector group perform training simultaneously, and the method for power adjustment is described in the following by taking a training procedure of an $m^{th}$ subscriber as an example.

Firstly: Feedback errors of all subscribers at current time $t_1$ are read and squared, and a subscriber with a maximum square value of the feedback error is found to determine a value of $P_{ini}$. Specifically, $$P_m(k, t_1) = K \frac{\max(E[e_1(k, t_1)^2, e_2(k, t_1)^2, \ldots, e_n(k, t_1)^2])}{E[x_m(k, t_1)^2]} \quad \text{(Formula 1)}$$

$$P_{ini}(k, t) = \quad \text{(Formula 2)}$$
$$P_{train} - K \frac{\max(E[e_1(k, t)^2, e_2(k, t)^2, \ldots, e_n(k, t)^2])}{E[x_m(k, t)^2]},$$
where $n \neq m$ The power to be increased during the training procedure is $$P'(k) = P_{train}(k) - P_{ini}(k) \quad \text{(Formula 3)}$$

It is assumed that the adjustment needs to be performed t times during the training procedure, and an average adjustment amount each time may be:

$$\Delta p = \frac{P'(k)}{t} \quad \text{(Formula 4)}$$

Secondly: Training is started and lasts for a time period $\Delta t$, with $P_{ini}$ as an initial value.

Thirdly: Feedback errors of all subscribers at the current time t are read and squared, and that a maximum square value of the feedback error is found.

$$P_m(k, t) = K \frac{\max(E[e_1(k, t)^2, e_2(k, t)^2, \ldots, e_n(k, t)^2])}{E[x_m(k, t)^2]} \quad \text{(Formula 5)}$$

A value of $P_m(k,t)$ is subtracted from a value of $P_m(k,t_1)$ to obtain a value of $\Delta P_m(k,t)$:

$$\Delta P_m(k,t) = P_m(k,t_1) - P_m(k,t) \quad \text{(Formula 6)}$$

When $\Delta P_m(k,t)$ is greater than or equal to the adjustment threshold $\Delta P$, the power adjustment is performed. If $\Delta P_m(k,t)$ is less than the adjustment threshold $\Delta P$, the power adjustment is not performed. A value of the power adjustment is an integer multiple of $\Delta P$, and a maximum value of the power is limited by a power upper threshold $P_{train}$.

In the formulas 1 to 6, $\Delta P_m(k,t)$ denotes a value of power to be adjusted at time t for a $k^{th}$ sub-carrier of an $m^{th}$ subscriber, $e_n(k,t)$ denotes a feedback error of the $k^{th}$ sub-carrier at the time t, which is fed back by an $n^{th}$ subscriber within the vector group, $\max(E[e_1(k,t)^2, e_2(k,t)^2, \ldots, e_n(k,t)^2])$ denotes a subscriber with a maximum square value of the feedback error within the vector group, the subscriber is a subscriber with the lowest current cancellation level, $x_m(k,t)$ denotes a size of a signal transmitted by the $k^{th}$ sub-carrier of a current line at the time t, and K denotes an adjustment coefficient. Moreover, $t_1$ denotes time at which a previous error is updated. When the filter achieves a high cancellation level or desirable convergence for the crosstalk, the transmission power $\Delta P_m(k,t)$ needs to be increased. When the filter does not achieve a high cancellation level or desirable convergence for the crosstalk, the transmission power $\Delta P_m(k,t)$ needs to be reduced.

Step S206: Adjust the transmission power when the power needs adjustment.

Step S207: Transmit a message for terminating the filter training to an opposite end, and terminate the filter training in a current stage.

Figure 7:
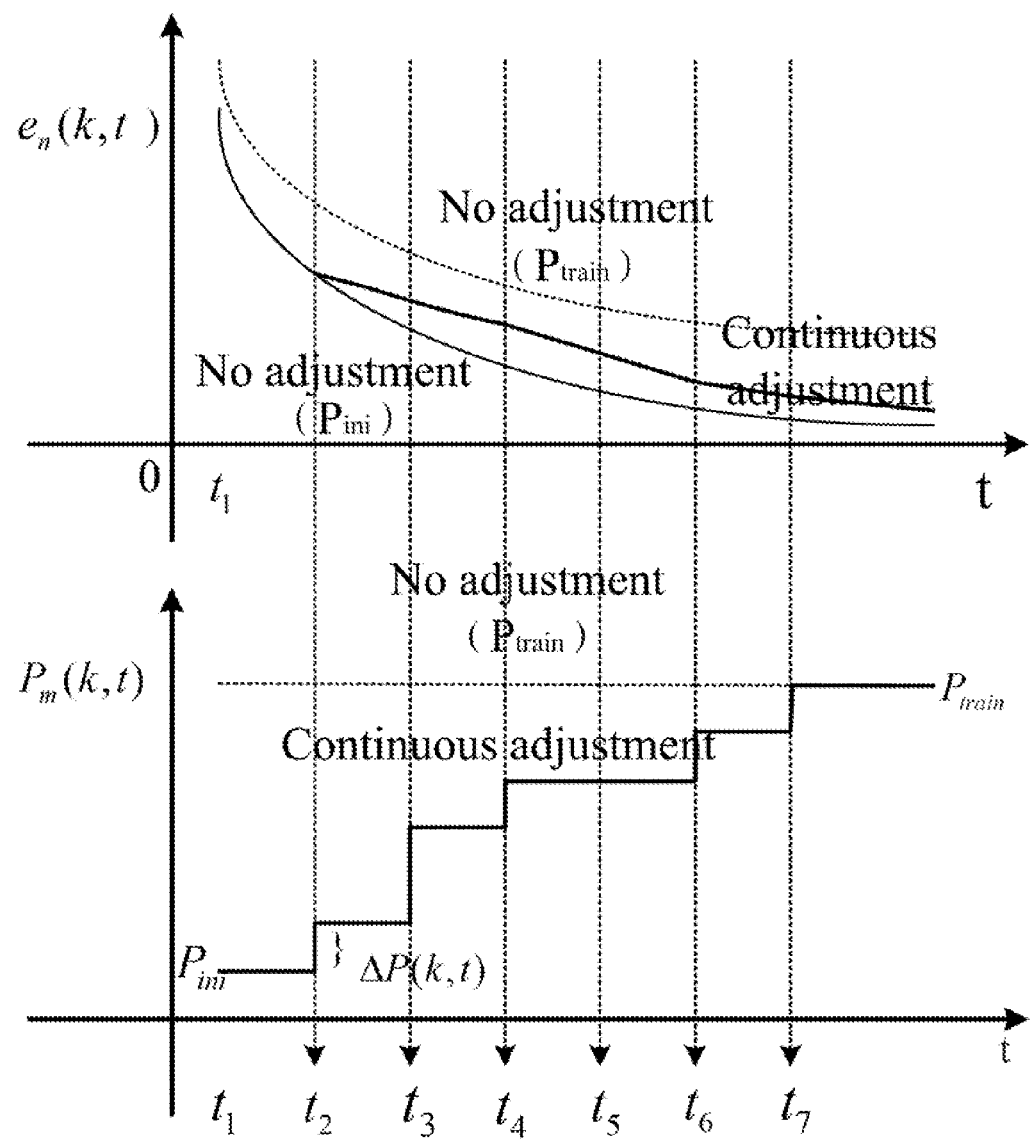
FIG. 7 is a schematic comparison diagram of a training procedure according to the second embodiment of the present disclosure.

Specifically, in the training procedure, if the transmission power is not adjusted, the precoder or canceller of the $m^{th}$ subscriber needs to have minimum influence on all n subscribers within the vector group during the training procedure, and the training needs be performed with the transmission power during the training. If the training starts with the power $P_{train}$, great influence is imposed on the subscribers within the vector group. Therefore, for a subscriber in a training state, a convergence speed of the precoder or canceller may be reduced obviously, or the precoder or canceller even has no convergence. More seriously, the training may fail. For a subscriber in Showtime, enormous error bits may occur, and the speed thereof may reduce significantly. More seriously, the subscriber may be deactivated. However, when the transmission power is adjusted during the training procedure, as shown in FIG. 7, comparison between a power adjustment status of the $k^{th}$ sub-carrier of the $m^{th}$ subscriber and an error variance status of the $n^{th}$ subscriber at different time during certain training is illustrated. In FIG. 7, no adjustment ($P_{train}$) denotes that an initial value of the $m^{th}$ subscriber is trained with $P_{train}$, and no power adjustment is performed; continuous adjustment denotes that the power is continuously adjusted according to feedback errors in the embodiment of the present disclosure; and no adjustment ($P_{ini}$) denotes that the training is started with $P_{ini}$, and no power adjustment is performed.

It can be seen that, in this embodiment, it is automatically determined whether the transmission power needs adjustment during a training procedure of a precoder or canceller, and the transmission power is automatically adjusted when the transmission power needs adjustment, so that interference to other subscribers caused by the precoder or the canceller during the training procedure is reduced, and call drop of the other subscribers are prevented.

An embodiment of the present disclosure further provides a system for power adjustment, which may use the method for power adjustment to adjust power. The system for power adjustment includes a DSLAM and a transceiver. The transceiver is configured to transmit a training sequence and start a training procedure. The DSLAM is configured to determine whether transmission power of a line needs adjustment according to feedback errors during a training procedure of a Vectored-DSL filter, and adjust the transmission power when the transmission power of the line needs adjustment.

Further, the DSLAM includes a determination module and an adjustment module.

The determination module is configured to determine whether the transmission power of the line needs adjustment according to the feedback errors during the training procedure of the Vectored-DSL filter.

The adjustment module is configured to adjust the transmission power when the determination module determines that the transmission power of the line needs adjustment.

A specific working procedure of the DSLAM of the system for power adjustment can refer to the method for power adjustment in the foregoing.

For example, during a procedure of determining whether the transmission power of the line needs adjustment, the DSLAM may analyze influence on other subscribers caused by increasing the transmission power by a certain adjustment value according to feedback errors of other subscribers within a vector group, so as to establish a correlation coefficient table corresponding to the adjustment value. Further, the DSLAM may determine a suitable adjustment threshold $\Delta P$ according to the correlation coefficient table.

Furthermore, the DSLAM may determine that the transmission power needs adjustment when $\Delta P_m(k,t)$ is not less than the adjustment threshold $\Delta P$, and determine that the transmission power needs no adjustment when $\Delta P_m(k,t)$ is less than the adjustment threshold $\Delta P$. $\Delta P_m(k,t)$ denotes a value of power to be adjusted for a $k^{th}$ sub-carrier of an $m^{th}$ subscriber at time t.

In this embodiment, it is determined automatically whether the transmission power needs adjustment during a training procedure of a Vectored-DSL filter, and the transmission power is adjusted automatically when the transmission power needs adjustment, so that the interference to other subscribers caused by the precoder or the canceller during the training procedure is reduced, and call drops of the other subscribers are prevented.

Figure 8:
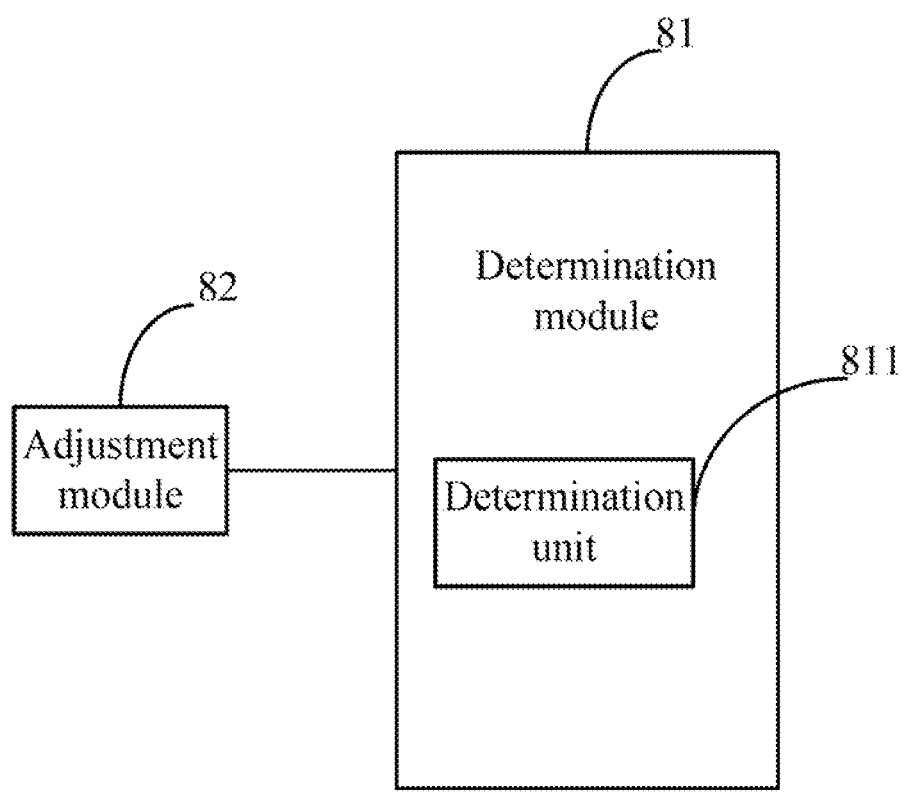
FIG. 8 is a structure diagram of a DSLAM according to a third embodiment of the present disclosure.

A third embodiment of the present disclosure provides a DSLAM. As shown in FIG. 8, the DSLAM includes a determination module 81 and an adjustment module 82.

The determination module 81 is configured to determine whether transmission power of a line needs adjustment according to feedback errors during a training procedure of a Vectored-DSL filter.

The adjustment module 82 is configured to adjust the transmission power when the determination module 81 determines that the transmission power of the line needs adjustment.

A specific working procedure of the DSLAM can refer to the method for power adjustment in the foregoing. For example, during a procedure of determining whether the transmission power of the line needs adjustment, the determination module 81 may analyze influence on other subscribers caused by increasing the transmission power by an adjustment value according to feedback errors of other subscribers within a vector group, so as to establish a correlation coefficient table corresponding to the adjustment value. In addition, the determination module 81 determines a suitable adjustment threshold ΔP according to the correlation coefficient table. Further, the determination module 81 may include a determination unit 811.

The determination unit 811 is configured to determine that the transmission power needs adjustment when $\Delta P_m(k,t)$ is not less than an adjustment threshold ΔP, or to determine that the transmission power needs no adjustment when $\Delta P_m(k,t)$ is less than the adjustment threshold. $\Delta P_m(k,t)$ denotes a value of power to be adjusted for a $k^{th}$ sub-carrier of an $m^{th}$ subscriber at time t.

Further, $\Delta P_m(k,t)$ may be calculated and obtained according to the following formula:

$$\Delta P_m(k,t) = P_m(k,t_1) - P_m(k,t);$$

in which $$P_m(k, t) = K \frac{\max(E[e_1(k, t)^2, e_2(k, t)^2, \ldots, e_n(k, t)^2])}{E[x_m(k, t)^2]};$$

and $$P_m(k, t_1) = K \frac{\max(E[e_1(k, t_1)^2, e_2(k, t_1)^2, \ldots, e_n(k, t_1)^2])}{E[x_m(k, t_1)^2]}.$$

$e_n(k,t)$ denotes a feedback error of the $k^{th}$ sub-carrier at the time t, which is fed back by an $n^{th}$ subscriber, $\max(E[e_1(k,t)^2, e_2(k,t)^2, \ldots e_n(k,t)^2])$ denotes a subscriber with a maximum square value of the feedback error, $x_m(k,t)$ denotes a size of a signal transmitted by the $k^{th}$ sub-carrier at the time t, K denotes an adjustment coefficient, and $t_1$ denotes a time at which a previous error is updated.

Further, the adjustment threshold may be determined according to the following formula:

$$\Delta p = \frac{P'(k)}{t};$$

in which $$P'(k) = P_{train}(k) - P_{ini}(k);$$

and $$P_{ini}(k, t) = P_{train} - K \frac{\max(E[e_1(k, t)^2, e_2(k, t)^2, \ldots, e_n(k, t)^2])}{E[x_m(k, t)^2]}.$$

$P_{ini}$ is an initial training power value, and $P_{train}$ is a maximum training power value.

It can be seen that, in this embodiment, it is determined automatically whether the transmission power needs adjustment during a training procedure of a precoder or canceller, and the transmission power is adjusted automatically when the transmission power needs adjustment, so that interference to other subscribers caused by the precoder or the canceller during the training procedure is reduced, and call drops of the other subscribers are prevented.

Through the descriptions of the foregoing embodiments, persons skilled in the art may clearly understand that the present invention may be implemented by hardware only or by software plus a necessary universal hardware platform. Based on such understandings, the technical solutions of the present invention may be embodied in the form of a software product. The software product may be stored in a non-volatile storage medium (a Compact Disc-Read Only Memory (CD-ROM), a Universal Serial Bus (USB) flash drive, and a removable hard disk). The software product includes a number of instructions that enable a computer device (a personal computer, a server or a network device) to perform the method provided in each embodiment of the present invention.

It should be noted that the above descriptions are merely exemplary embodiments of the present invention, and persons of ordinary skill in the art may make various improvements and modifications without departing from the principles of the present invention. All such improvements and modifications shall fall within the protection scope of the present disclosure.

What is claimed is:

1. A method for power adjustment, comprising:
   determining whether transmission power of a line needs adjustment according to feedback during of a Vectored-Digital Subscriber Line (Vectored-DSL) filter; and
   adjusting the transmission power when the transmission power of the line needs adjustment;
   wherein the determining whether the transmission power of the line needs adjustment according to the feedback errors comprises:
   training by using an initialized transmission power $P_{ini}$, and obtaining feedback errors of other subscribers within a vector group;
   increasing the transmission power by an adjustment value, and re-obtaining feedback errors of the other subscribers within the vector group;
   analyzing an influence on the other subscribers caused by the increase of the adjustment value to the transmission power according to the feedback errors, and establishing a correlation coefficient table corresponding to the adjustment value;
   determining an adjustment threshold ΔP according to the correlation coefficient table;
   determining that the transmission power needs adjustment when $\Delta P_m(k,t)$ is not less than the adjustment threshold ΔP; and
   determining that the transmission power needs no adjustment when $\Delta P_m(k,t)$ is less than the adjustment threshold ΔP;
   wherein $\Delta P_m(k,t)$ denotes a value of power to be adjusted for a $k^{th}$ sub-carrier of an $m^{th}$ subscriber at time t;
   wherein $$\Delta P_m(k,t) = P_m(k,t_1) - P_m(k,t);$$

in which, $$P_m(k, t) = K \frac{\max(E[e_1(k, t)^2, e_2(k, t)^2, \ldots, e_n(k, t)^2])}{E[x_m(k, t)^2]};$$

and $$P_m(k, t_1) = K \frac{\max(E[e_1(k, t_1)^2, e_2(k, t_1)^2, \ldots, e_n(k, t_1)^2])}{E[x_m(k, t_1)^2]};$$

wherein $e_n(k,t)$ denotes an error of the $k^{th}$ sub-carrier fed back by an $n^{th}$ subscriber at the time t, $\max(E[e_1(k,t)^2, e_2(k,t)^2, \ldots, e_n(k,t)^2])$ denotes a subscriber with a maximum square value of the feedback error, $x_m(k,t)$ denotes a size of a signal transmitted by the $k^{th}$ sub-carrier at the time t, K denotes an adjustment coefficient, and $t_1$ denotes time at which a previous error is updated.

2. The method according to claim 1, wherein $$\Delta p = \frac{P'(k)}{t};$$

in which $$P'(k) = P_{train}(k) - P_{ini}(k);$$

and $$P_{ini}(k, t) = P_{train} - K \frac{\max(E[e_1(k, t)^2, e_2(k, t)^2, \ldots, e_n(k, t)^2])}{E[x_m(k, t)^2]};$$

wherein $P_{ini}$ is an initial training power value, and $P_{train}$ is a maximum training power value.

3. A method for power adjustment, comprising
determining whether transmission power of a line needs adjustment according to feedback errors during a training procedure of a Vectored-Digital Subscriber Line (Vectored-DSL) filter; and
adjusting the transmission power when the transmission power of the line needs adjustment;
wherein the determining whether the transmission power of the line needs adjustment according to the feedback errors comprises:
collecting feedback errors of subscribers within a vector group for multiple times, wherein different transmission powers are used for training the Vectored-DSL filter at the multiple times of the feedback error collection;
calculating an adjustment threshold $\Delta P$ according to the collected feedback errors; and
determining whether a value of the transmission power to be adjusted reaches the adjustment threshold $\Delta P$, if so, determining that the transmission power of the line needs adjustment;
wherein the collecting feedback errors of subscribers within a vector group for multiple times comprises:
taking statistics of the feedback errors of subscribers of other lines within the vector group with the Vectored-DSL filter being trained by use of an initialized transmission power;
re-taking statistics of the feedback errors of the subscribers of other lines within the vector group for multiple times, with the Vectored-DSL filter being trained by use of an updated transmission power;
wherein the updated transmission power used in each time of the feedback errors statistics has a predetermined adjustment value greater than that used in a previous time of the feedback errors statistics;
wherein the calculating an adjustment threshold $\Delta P$ according to the collected feedback errors comprises:
establishing a correlation coefficient table according to the collected feedback errors, the correlation coefficient table is configured to indicate influence on the subscribers of other lines within the vector group caused by the increase of adjustment value; and
calculating an adjustment threshold $\Delta P$ according to a subscriber having greater influence than other subscribers in the table, wherein the calculated adjustment threshold $\Delta P$ is used for power adjustment in next time of the feedback errors statistics.

4. The method according to claim 3, wherein the correlation coefficient table is updated dynamically during the training procedure of the Vectored-DSL filter.

5. A Digital Subscriber Line Access Multiplexer (DSLAM), comprising:
a determination module, configured to determine whether transmission power of a line needs adjustment according to feedback errors during a training procedure of a Vectored-Digital Subscriber Line (Vectored-DSL) filter; and
an adjustment module, configured to adjust the transmission power when the determination module determines that the transmission power of the line needs adjustment;
wherein during a procedure of determining whether the transmission power of the line needs adjustment, the determination module analyzes influence caused by increasing the transmission power by an adjustment value according to feedback errors of other subscribers within a vector group, establishes a correlation coefficient table corresponding to the adjustment value, and determines a suitable adjustment threshold $\Delta P$ according to the correlation coefficient table;
wherein the determination module comprises:
a determination unit, configured to determine that the transmission power needs adjustment when $\Delta P_m(k,t)$ is not less than an adjustment threshold $\Delta P$, or determine that the transmission power needs no adjustment when $\Delta P_m(k,t)$ is less than $\Delta P$ wherein $\Delta P_m(k,t)$ denotes a value of power to be adjusted for a $k^{th}$ sub-carrier of an $m^{th}$ subscriber at time t;
wherein $$\Delta P_m(k,t) = P_m(k,t_1) - P_m(k,t);$$

in which, $$P_m(k, t) = K \frac{\max(E[e_1(k, t)^2, e_2(k, t)^2, \ldots, e_n(k, t)^2])}{E[x_m(k, t)^2]};$$

and $$P_m(k, t_1) = K \frac{\max(E[e_1(k, t_1)^2, e_2(k, t_1)^2, \ldots, e_n(k, t_1)^2])}{E[x_m(k, t_1)^2]};$$

wherein $e_n(k,t)$ denotes an error of the $k^{th}$ sub-carrier fed back by an $n^{th}$ subscriber at the time t, $\max(E[e_1(k,t)^2, e_2(k,t)^2, \ldots, e_n(k,t)^2])$ denotes a subscriber with a maximum square value of the feedback error, $x_m(k,t)$ denotes a size of a signal transmitted by the $k^{th}$ sub-carrier at the time t, K denotes an adjustment coefficient, and $t_1$ denotes time at which a previous error is updated.

6. The DSLAM according to 5, wherein $$\Delta p = \frac{P'(k)}{t};$$

in which, $$P'(k) = P_{train}(k) - P_{ini}(k);$$

and $$P_{ini}(k, t) = P_{train} - K \frac{\max(E[e_1(k, t)^2, e_2(k, t)^2, \ldots, e_n(k, t)^2])}{E[x_m(k, t)^2]};$$

wherein $P_{ini}$ is an initial training power value, and $P_{train}$ is a maximum training power value.

* * * * *

UNITED STATES PATENT AND TRADEMARK OFFICE
CERTIFICATE OF CORRECTION

PATENT NO. : 8,472,615 B2
APPLICATION NO. : 13/097347
DATED : June 25, 2013
INVENTOR(S) : Fang et al.

It is certified that error appears in the above-identified patent and that said Letters Patent is hereby corrected as shown below:

In the Claims

Claim 1, column 8, line 26, "according to feedback during of a" should read

-- according to feedback errors during a --.

Signed and Sealed this
Seventeenth Day of September, 2013

Teresa Stanek Rea
*Deputy Director of the United States Patent and Trademark Office*